US011223809B2

(12) United States Patent
Wei et al.

(10) Patent No.: US 11,223,809 B2
(45) Date of Patent: *Jan. 11, 2022

(54) VIDEO COLOR MAPPING USING STILL IMAGE

(71) Applicant: Google LLC, Mountain View, CA (US)

(72) Inventors: Li Wei, Kingwood, TX (US); Wei Hong, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/570,613

(22) Filed: Sep. 13, 2019

(65) Prior Publication Data
US 2021/0084272 A1 Mar. 18, 2021

(51) Int. Cl.
H04N 9/69 (2006.01)
G06T 7/00 (2017.01)
G06T 7/90 (2017.01)
G06T 5/00 (2006.01)
G06T 5/50 (2006.01)
H04N 5/232 (2006.01)
H04N 9/64 (2006.01)

(52) U.S. Cl.
CPC ............... *H04N 9/69* (2013.01); *G06T 5/002* (2013.01); *G06T 5/50* (2013.01); *G06T 7/90* (2017.01); *G06T 7/97* (2017.01); *H04N 5/23229* (2013.01); *H04N 9/646* (2013.01); G06T 2207/10016 (2013.01); G06T 2207/10024 (2013.01); G06T 2207/20021 (2013.01); G06T 2207/20084 (2013.01); G06T 2207/30168 (2013.01)

(58) Field of Classification Search
None
See application file for complete search history.

(56) References Cited

U.S. PATENT DOCUMENTS

| 2016/0093029 | A1 | 3/2016 | Micovic et al. |
| 2018/0025477 | A1* | 1/2018 | Min ..................... H04N 1/6027 345/590 |
| 2018/0288381 | A1* | 10/2018 | He ......................... H04N 19/85 |
| 2020/0005443 | A1* | 1/2020 | Fors .......................... G06T 5/50 |

FOREIGN PATENT DOCUMENTS

CN 105279485 B 12/2018

OTHER PUBLICATIONS

Extended European Search Report for European Application No. 20195819.6, dated Dec. 18, 2020, 9 pages.

* cited by examiner

*Primary Examiner* — Quan Pham
(74) *Attorney, Agent, or Firm* — Brake Hughes Bellermann LLP

(57) ABSTRACT

Techniques described herein include capturing a plurality of frames associated with a video file, capturing an image corresponding to one of the plurality of frames, generating a color map between the captured image and a corresponding frame of the plurality of frames, where the color map is based on a color and a tone of the captured image and a color and tone of the corresponding frame, tone correcting one or more selected frames associated with the video file based on the color map, and color correcting the one or more selected frames based on the color map.

20 Claims, 9 Drawing Sheets

VIDEO COLOR MAPPING USING STILL IMAGE

BACKGROUND

An image can correspond to one of a plurality of sequential (e.g., in time) images sometimes called a photo file strip and/or associated with a frame of a short video sometimes called a motion-photo and/or micro-video. The image can have a color/lighting difference when compared to a corresponding image of the plurality of sequential images (e.g., photo file strip) or frame of the short video (e.g., micro-video). This color/lighting difference can be noticeable when a viewer switches (e.g., when viewing on mobile device) between the image and the plurality of sequential images (e.g., photo file strip) or the short video (e.g., micro-video) leading to a less than desirable user experience.

SUMMARY

Implementations improve the visual quality of frames of a video using a quality corrected image captured at substantially the same moment in time as one of the frames of the video. To improve the visual quality of the frames of the video at least one quality parameter difference between the corrected image and a corresponding frame of the video can be determined. Then, the visual quality of the frames of the video can be improved using the at least one quality parameter difference.

A general aspect, includes capturing a plurality of frames associated with a video file, capturing an image corresponding to one of the plurality of frames, generating a color map between the captured image and a corresponding frame of the plurality of frames, where the color map is based on a color and a tone of the captured image and a color and tone of the corresponding frame, tone correcting one or more selected frames associated with the video file based on the color map, and color correcting the one or more selected frames based on the color map.

Implementation can include one or more of the following features, alone or in any combination with each other. For example, a post-capture process can be performed on the captured image to improve a visual quality of the image.

The color map can include at least one correctable quality parameter difference between the captured image and the corresponding frame.

Tone correcting the one or more selected frames can include matching at least one of a pixel, a block of pixels, a range of pixels, or a partition of the one or more selected frames to at least one of a pixel, a block of pixels, a range of pixels, or a partition of the color map and using a value of the color map to perform the tone correcting of the one or more selected frames, and color correcting the one or more selected frames can include matching at least one of the pixel, the block of pixels, the range of pixels, or the partition of the one or more selected frames to at least one of the pixel, the block of pixels, the range of pixels, or the partition of the color map, and the value of the color map can be used to perform the color correcting of the one or more selected frames.

The color map can be partitioned into an M×N grid having M columns and N rows, where each partition includes data indicating a correction parameter, and the correction parameter can include a value for gamma correction.

Color correcting the one or more selected frames can include performing a smoothing process to minimize color discontinuities in the one or more selected frames.

The image and the frame to which the image corresponds can be captured in a same instance.

The captured image can be partitioned, and the corresponding frame can be partitioned into a partitioned frame, and generating the color map can include: determining a color variance between each partition of the image and a corresponding partition of the partitioned frame and determining a tone variance between each partition of the image and a corresponding partition of the partitioned frame, and at least one of the determined color variance and the determined tone variance can be based on a luminance difference or a chrominance difference.

Another general aspect includes capturing a plurality of frames associated with a video file, capturing an image corresponding to one of the plurality of frames, generating a color map based on a color and a tone of the image and a color and tone of the frame to which the image corresponds, generating a data structure including data representing the color map, and storing the data structure as metadata in a header associated with the video.

Implementation can include one or more of the following features, alone or in any combination with each other. For example, a post-capture process can be performed on the captured image to improve a visual quality of the image.

The color map can include at least one correctable quality parameter difference between the image and the frame to which the image corresponds.

Generating the data structure can include partitioning the color map into an M×N grid having M columns and N rows, where each partition can include data indicating a correction parameter, and the correction parameter can include a value for gamma correction.

The captured image can be partitioned and the frame to which the image corresponds can be partitioned into a partitioned frame, and generating the color map can include: determining a color variance between each partition of the image and a corresponding partition of the partitioned frame and determining a tone variance between each partition of the image and a corresponding partition of the partitioned frame, where at least one of the color variance and the tone variance is based on a luminance difference or a chrominance difference.

Another general aspect includes receiving a video file including a plurality of frames and a header including a data structure including data representing a color map, selecting a first frame of the plurality of frames, the first frame being associated with the data representing the color map, selecting a second frame of the plurality of frames, the second frame being a target frame for color correction, tone correcting the second frame based on the color map, and color correcting the second frame based on the color map.

Implementation can include one or more of the following features, alone or in any combination with each other. For example, the tone correcting of the frame can include matching at least one of a pixel, a block of pixels, a range of pixels, or a partition of the frame to at least one of a pixel, a block of pixels, a range of pixels, or a partition of the color map and using a value of the color map to perform the tone correcting of the frame and the color correcting of the frame can include matching at least one of the pixel, the block of pixels, the range of pixels, or the partition of the frame to at least one of the pixel, the block of pixels, the range of pixels, or the partition of the color map, and the value of the color map can be used to perform the color correcting of the frame.

The color map can be partitioned into an M×N grid having M columns and N rows, where each partition can include data indicating a correction parameter, and the correction parameter can include a value for gamma correction.

Color correcting the second frame can include performing a smoothing process to minimize color discontinuities.

Color correcting the second frame can include performing a blending process to minimize color discontinuities.

Color correcting the second frame can include using a trained convolutional neural network to minimize color variance between a partition of the second frame and a partition of the color map.

Color correcting the second frame can include performing a chrominance correction process using a mean value of a color space variable and a variance value of the color space variable.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein.

Figure 1A:
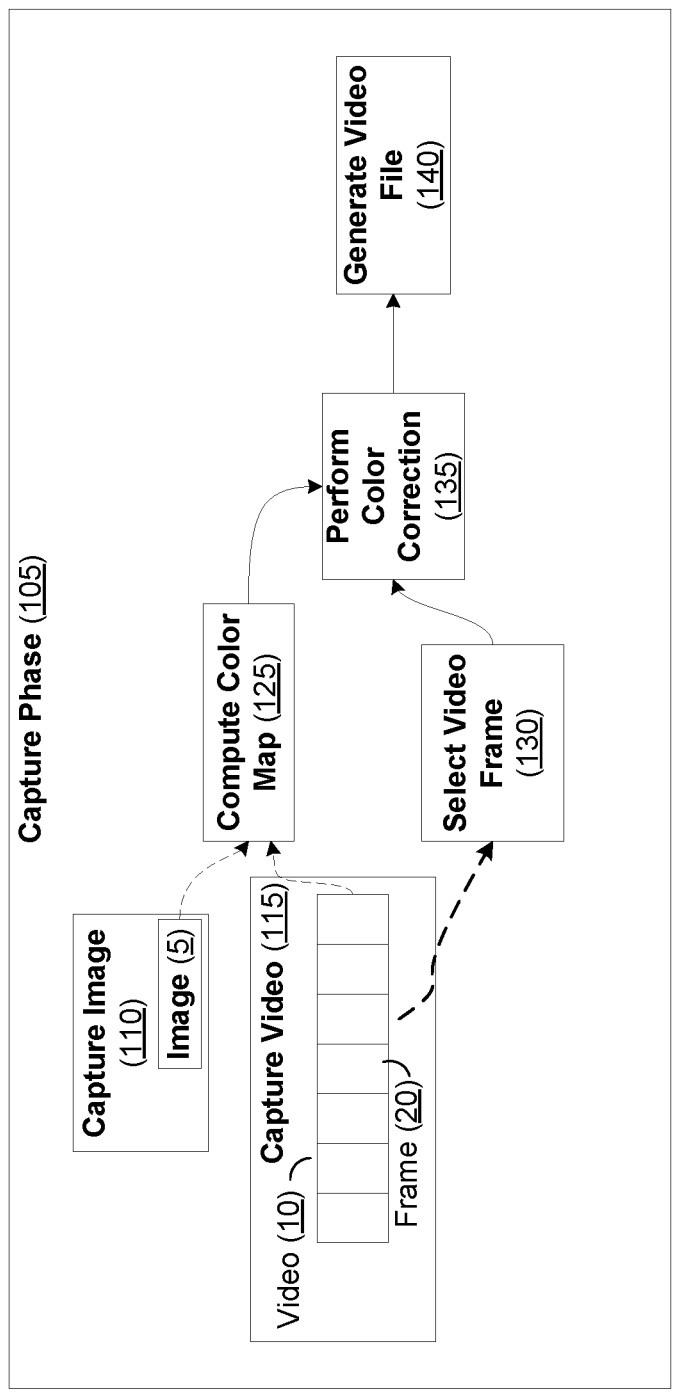
FIG. 1A illustrates a block diagram of a process of generating a video file according to an example implementation.

It should be noted that these Figures are intended to illustrate the general characteristics of methods, structure and/or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementations. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Typically, cameras perform at least one type of post-capture processing on an image to improve the visual quality of the image. The post-capture processing that can improve the visual quality can include noise reduction, stabilization, exposure balancing white balancing, color noise reduction, color correction, tone scaling, gamma correction and/or the like. However, not all of these image post-capture processing operations can be performed during video capture because of the processing time restrictions during video capture. In other words, to capture video at a given frame rate, time consuming post-capture processing that can improve visual quality may not be performed.

Accordingly, at least one technical problem addressed by this disclosure is the disparity in visual quality between an image and a corresponding frame of a video resulting from post-capture processing operations that are performed on the image that are not performed on the frame of the video. The disparity in visual quality can result in a less than desirable user experience when a user of a device displays both the image, the corresponding frame of the video and/or other frames of the video on a display of the device at the same time. The disparity in visual quality can result in a less than desirable user experience when the user of the device cycles between displaying the image and the corresponding frame of the video and/or other frames of the video on the display of the device.

The technical solution to the aforementioned technical problem that is disclosed by this disclosure includes generating a color map defining at least one correctable quality parameter difference between the image and the corresponding frame of the video, and correcting at least one frame of the video using the color map. The corrected at least one frame of the video can be stored in memory for future display and/or the corrected at least one frame of the video can be displayed in response to completing the correction.

The technical effect of the aforementioned technical solution is improved visual quality for each frame (or image) associated with the video. The technical improvement can be derived from using the color map to improve visual quality. This is an improvement over a technique that attempts to use post-capture processing on each frame of the video because the disclosed technical improvement reduces processing demand on the capture device (e.g., a device of limited processing capability) and/or as an operation during capture on the capture device because the image improvement operation can be performed independent of the capture process.

FIG. 1A illustrates a block diagram of a process of generating a video file according to an example implementation. As shown in FIG. 1A, a capture phase 105 includes capturing an image 110 including an image 5, capturing a video 115 including a video 10 having a plurality of frames 20, computing a color map 125, selecting a video frame 130, performing a color correction 135, and generating a video file 140. The capture phase 105 can be implemented by a device including a camera (e.g., a digital camera, a digital video device, a mobile phone and the like). The image 5 and the video 10 can be captured by the camera. One of the plurality of frames 20 and the image 5 can be captured at substantially (e.g., by a same shutter event) same moment in time.

Typically, images captured with camera movement in environments with uneven lighting or low amounts of light can result in blurry images or include random variations in color, brightness and/or tone from pixel to pixel. Accordingly, in an example implementation, post-capture processing is performed on the image 5. The post-capture processing can be configured to improve the visual quality (e.g., improve color, improve tone, and the like), reduce image noise (e.g., improve color variance, improve tone variance, stabilize for movement, etc.), and the like. The post-capture processing can use optical image stabilization (OIS), artificial intelligence, High Dynamic Range (HDR) techniques, HDR+ techniques, sampling, exposure, multi-image averaging and the like to improve the quality of the image 5.

For example, a HDR+ technique can take a burst of image shots with short exposure times, align the images algorithmically, and replace each pixel in a resultant image (e.g., the image to be stored) with the average color at that position across all the image shots. However, similar post-capture processing may not be performed on the video 10. Accordingly, the corresponding one of the plurality of frames 20 and the image 5 can have a different visual quality. Furthermore, the image 5 can have a relatively higher visual quality than the corresponding one of the plurality of frames 20. As a result, the image 5 can have a relatively higher visual quality than the video 10.

In an example implementation, a color map 125 is generated (e.g., via computer processing). The color map can be generated based on the corresponding one of the plurality of frames 20 and the image 5. The color map can include the color and tone variance between the corresponding one of the plurality of frames 20 and the image 5. For example, the corresponding one of the plurality of frames 120 can be stored using the YUV color space and the image 5 can be stored using the YUV color space. Accordingly, the color map can include the difference between a Y (luminance) and UV (chrominance) of the corresponding one of the plurality of frames 120 and the image 5. The color map can include a pixel-by-pixel variance, a value associated with a block of pixels, a value associated with a partition of the corresponding one of the plurality of frames 20 and/or the image 5 and the like. The plurality of frames 20 and/or the image 5 can be stored using a color space other than the YUV color space. For example, the plurality of frames 20 and/or the image 5 can be stored using the RGB, Y'UV, YCbCr, YPbPr, and the like color spaces.

In an example implementation, the image 5 can be a color corrected image captured at substantially (e.g., by a same shutter event) same moment in time as a video frame (e.g., one of the plurality of frames 20) is captured. In an example implementation, image 5 can be a HDR+ image and video 10 can be a short video (e.g., a micro-video) encoded using the MPEG4 standard sometimes called a MPEG4 microvideo. Accordingly, the image 5 and the video 10 can be stored using the YUV color space. The image 5 and/or the video 10 can be compressed (e.g., encoded) prior to storing (e.g., as a mp4 file). Although the MPEG4 and mp4 standard is referenced, other image and video file standards can be used in example implementations described herein. Although the YUV color space is referenced, other image color spaces (e.g., RGB, Y'UV, YCbCr, YPbPr, and the like) color spaces can be used in example implementations described herein.

Performing color correction 135 (e.g., via computer processing) can include using the color map to perform color and/or tone correction on at least one video frame. For example, color and/or tone correction can be performed on frames of video 10. In an example implementation, the color and/or tone correction can be performed on each of the plurality of frames 20. In another example implementation, the color and/or tone correction can be performed on a selected video frame 130 (e.g., selected from the plurality of frames 20). Performing the color correction 135 can include matching at least one of a pixel, a block of pixels, a range of pixels, and/or a partition of the selected video frame 130 to at least one of a pixel, a block of pixels, a range of pixels, and/or a partition of the color map and then using corresponding values of the color map to perform color and/or tone correction on the video frame (e.g., the selected video frame 130). The video file 140 can be generated to include the color and/or tone corrected plurality of frames 20.

The video file 140 generated in FIG. 1A can be color corrected during the capture phase 105 at the device capturing the video 10 and the image 5. However, computing the color map 125, selecting the video frame 130 and performing color correction 135 can be performed independent of capturing the video 115. In other words, capturing the video 115 can continue while color correction is performed on previously captured frames 20. The (color corrected) video 10 can then be rendered using any rendering technique.

Figure 1B:
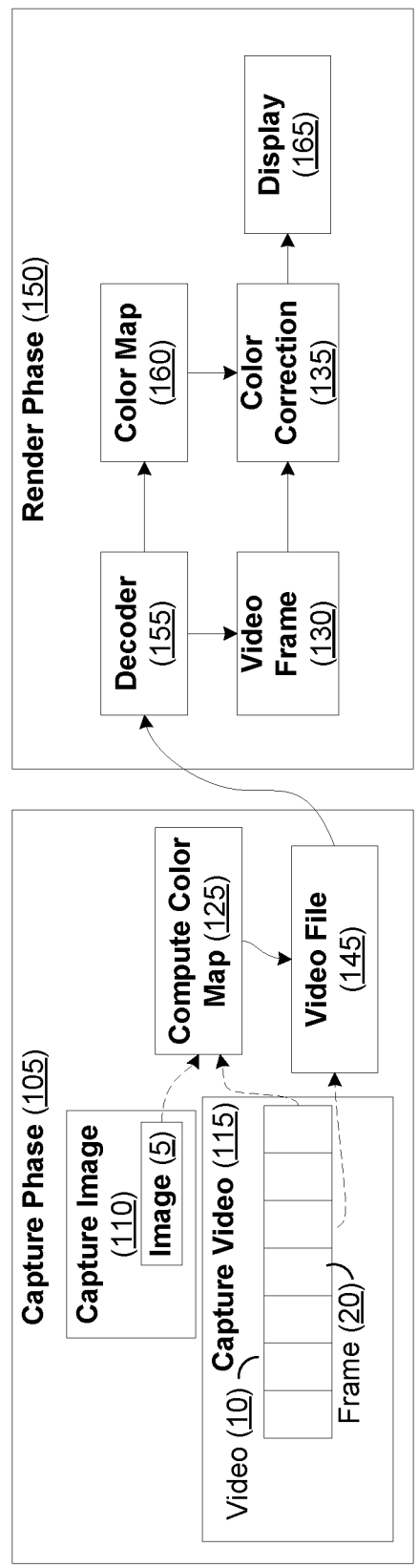
FIG. 1B illustrates a block diagram of a process of generating a video file and rendering a video according to an example implementation.

In some example implementations, color correction can be performed at a rendering device (e.g., a mobile phone, a laptop computer, a desktop computer, and the like). FIG. 1B illustrates a block diagram of generating a video file and rendering a video according to an example implementation. As shown in FIG. 1B, during the capture phase 105, the color map 125 is generated (e.g., via computer processing) based on the corresponding one of the plurality of frames 20 and the image 5. However, in this implementation generating a video file 145 includes using the video 10 and the color map.

The video file 145 can be encoded and communicated (e.g., via a wired or wireless communication channel) to the rendering device configured to implement the rendering phase 150. The rendering phase 150 can include using decoder 155 to decode an encoded video file 145, selecting a color map 160 from the decoded video file, selecting the video frame 130 from the decoded video file, performing color correction 135 and displaying 165 the corrected video. The decoding the video file 145 can be performed by a decoder 155 where the color map 160 and a reconstructed plurality of frames 120 are obtained. Video frame 130 can be selected from the reconstructed plurality of frames 20.

Performing the color correction 135 (e.g., via computer processing) can use the color map 160 to perform color and/or tone correction on a selected video frame 130. The color and/or tone correction can be performed on each of the reconstructed plurality of frames 20. The color correction 135 can include matching a pixel, a block of pixels a range of pixels, or a partition of the selected video frame 130 to a pixel, a block of pixels a range of pixels, or a partition of the color map and then using a corresponding value of the color map to perform color and/or tone correction on the video frame 130. The color and/or tone corrected video frame can be rendered on display 165.

Figure 2:
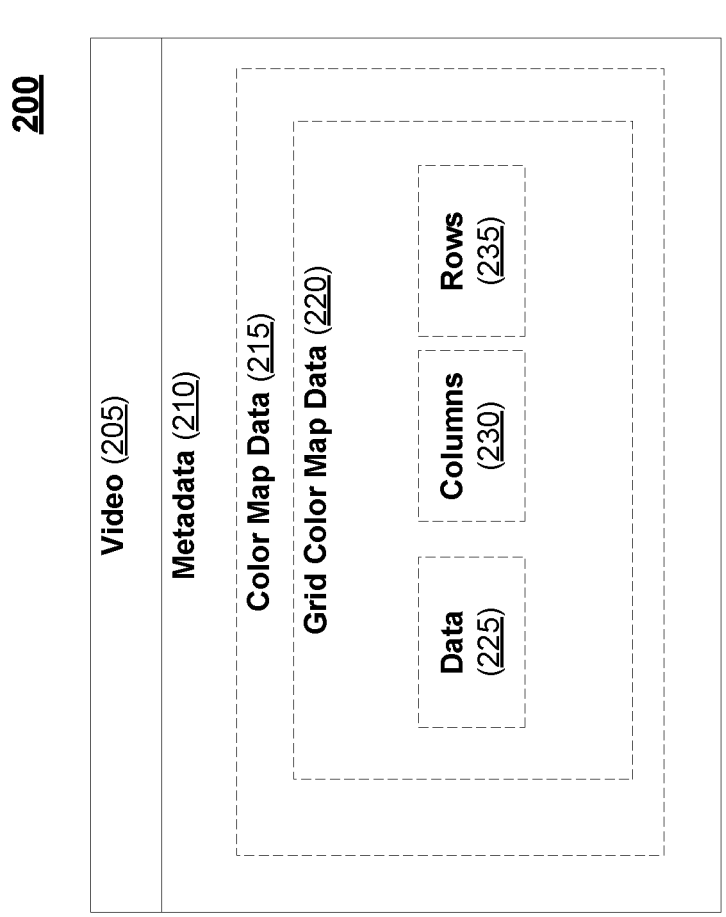
FIG. 2 illustrates a data structure for a video file according to an example implementation.

FIG. 2 illustrates a data structure for a video file (e.g., a generated video file 145) according to an example implementation. As shown in FIG. 2, the data structure 200 includes a video 205. The video 205 includes metadata 210. The metadata 210 includes color map data 215. The color map data 215 can include different types of color maps. For example, the color map data 215 can include a pixel to pixel map(s), a block to block map(s) and or the like. As shown in FIG. 2, the color map data 215 includes grid color map data 220 having data 225, columns 230, and rows 235.

The video 205 can include data associated with a computed color map (e.g., computed color map 125). For example, as discussed above, the color map can be generated based on the corresponding one of the plurality of frames 20 and the image 5. The color map can include the color and tone variance between the corresponding one of the plurality of frames 20 and the image 5.

Metadata 210 can include color map data (e.g., color map 160) as generated using a compute color map process (e.g., by compute color map 125). The columns 230 and rows 235 indicate a number of rows and a number of columns that the color map is partitioned into. For example, the color map can be partitioned into an M×N grid (e.g., 4×4 grid (see FIG. 3 below), a 3×4 grid, a 4×3 grid, and the like). Example implementations are not limited to a grid size. However, too few partitions can limit the effectiveness of the color correction and too many partitions can require a relatively large amount of processing resources and/or memory and may create a time delay in rendering due to processing the error correction.

The data 225 can include a correction parameter(s). The correction parameter(s) can be a value used to correct for tone and/or color. In an example implementation, Y (luminance) can be corrected using gamma correction $Y_{corrected}=Y^\gamma$ and UV (chrominance) can be corrected using a mean value of U, V and a variance value of U, V. For example, the mean value of U, V can be subtracted from the data and the result can be scaled based on the variance of U, V. Accordingly, the correction parameter(s) (e.g., for each partition in the M×N grid) can include a gamma correction value, a mean value of U, V and a variance value of U, V.

In another example implementation, a color correction matrix (CCM) can be used to correct for tone and/or color. In this implementation the dot product of a 3×3 CCM and YUV can generate YUV corrected. Accordingly, the correction parameter(s) (e.g., for each partition in the M×N grid) can include a 3×3 CCM. Other techniques can be used to correct for tone and/or color. In addition, color correction can be performed in other color spaces. For example, the aforementioned 3×3 CCM can be used to perform tone and/or color correction in the RGB color space. In an example implementation, the correction parameter(s) can be generated (e.g., via computer processing) in the compute color map 125 block based on the corresponding one of the plurality of frames 120 and the image 5.

Furthermore, a convolutional neural network (CNN) can be used to correct for tone and/or color. In this implementation, the correction parameter(s) can include a CNN architecture and the weights associated with each neuron of the CNN. In addition, a machine learning (ML) algorithm (e.g., based on the CNN) can be used to train the CNN (e.g., modify the weights) to best correct for tone and/or color. In an example implementation, the correction parameter(s), as weights, can vary the color profile and variance for each partition. Therefore, the CNN can vary the color profile to minimize a variance between the color profile and a pixel (e.g., YUV, RGB and the like) in each partition.

In some implementations, histogram matching and point based transfer can be used in the color and/or tone correcting processes. For example, histogram matching can include modifying the tone and/or color data of the frame to be color corrected until a histogram associated with the frame matches a histogram of the image. In this implementation the histogram can be associated with the matched partition. Point based transfer can include using a scattered point interpolation technique using moving least squares. Scattered point interpolation can include applying a high-order polynomial to the tone and/or color data of the frame in order to interpolate or fit data of the frame to the tone and/or color data of the image. Moving least squares uses a local polynomial such that, in this implementation, the scattered point interpolation can be implemented on the matched partition.

In some implementations, there can be tone and/or color discontinuities on the border between two partitions or blocks in the N×M grid for the tone and/or color corrected frame. Therefore, the color correction process can include a smoothing and/or blending process to remove or minimize the tone and/or color discontinuities. For example, a bilinear interpolation process can be implemented with the color correction 135 block. The bilinear interpolation process can be configured to remove or minimize the tone and/or color discontinuities. Bilinear interpolation can be implemented as a resampling and/or filtering operation. Bilinear interpolation can be implemented based on a tile (or fragment) location within a grid. For example, a tile located at a corner of the grid can be mapped to a closes color. A tile located at a boundary of the grid can be linear interpolated based on 2 colors (e.g., 2 mapped colors). Other tiles can be bi-linear interpolated based on 4 colors (e.g., 4 mapped colors). Other interpolation techniques can be used as well. For example, nearest neighbor, bicubic, higher order, and the like interpolation techniques can be used.

Figure 3:
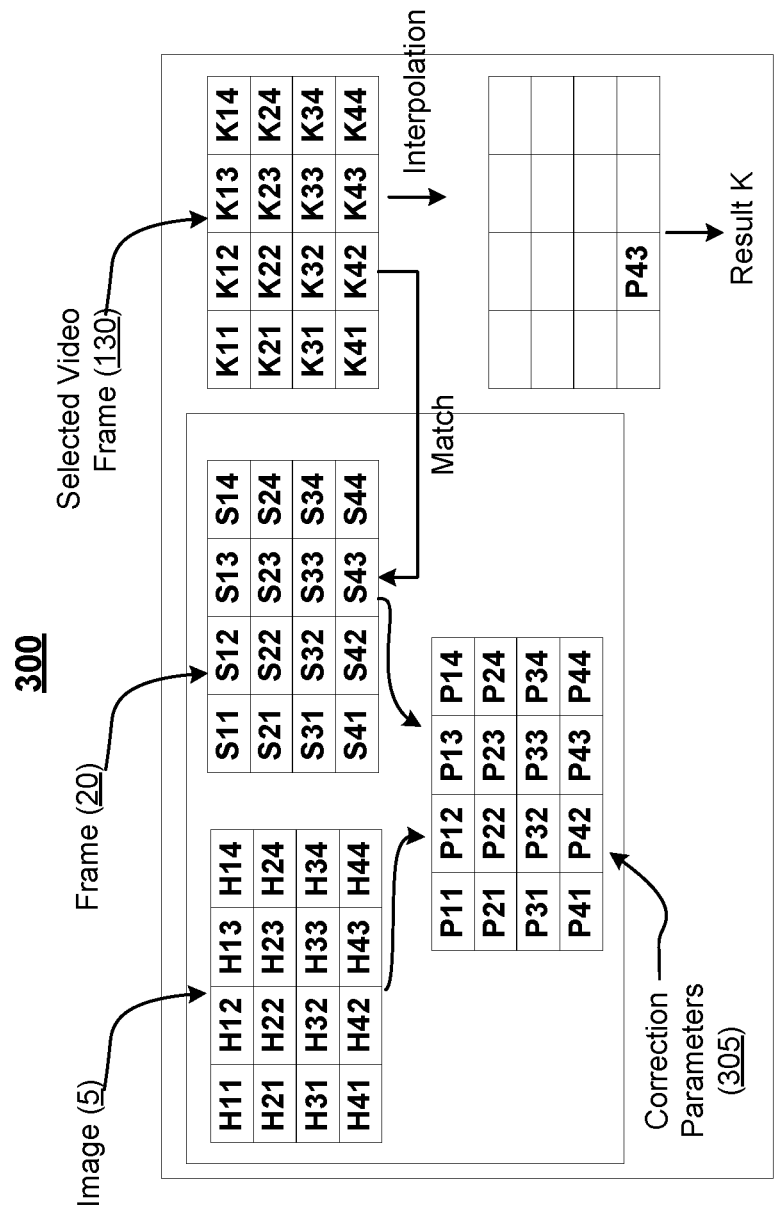
FIG. 3 illustrates a block diagram showing processing of a frame of a video file according to an example implementation.

FIG. 3 illustrates a block diagram showing processing of a frame of a video file according to an example implementation. As shown in FIG. 3, the image 5 and frame 20 are each partitioned into a 4×4 grid including 16 partitions. The partitions can be labeled using the row number and column number. The image 5 is shown as being partitioned into 16 partitions including H11, H12, H13, H14, H21, H22, H23, H24, H31, H32, H33, H34, H41, H42, H43, and H44. The frame 20 is shown as being partitioned into 16 partitions including S11, S12, S13, S14, S21, S22, S23, S24, S31, S32, S33, S34, S41, S42, S43, and S44. Each partition (e.g., H11, S11, . . . , H44, S44) includes at least one pixel. The pixels' values (e.g., YUV, RGB, and the like) of the image 5 and the frame 20 can be used to generate (e.g., calculate) correction parameter(s) 305.

The grid color map data 220 is shown as being partitioned into 16 partitions including P11, P12, P13, P14, P21, P22, P23, P24, P31, P32, P33, P34, P41, P42, P43, and P44. Each partition (e.g., P11, P12, . . . , P44) includes a corresponding correction parameter(s) 305. The video frame 130 is shown as being partitioned into 16 partitions including K11, K12, K13, K14, K21, K22, K23, K24, K31, K32, K33, K34, K41, K42, K43, and K44. Each partition (e.g., K11, K12, . . . , K44) includes at least one pixel. The at least one pixel can be an uncorrected pixel. To process (e.g., color and tone correct) the video frame 130, a partition (e.g., the pixels of the partition) can be matched to (or a match can be found in) a partition in the frame 20. As is shown in FIG. 3, partition K42 of the video frame 130 is matched to partition S43 of the frame 20. Therefore, during color correction, the correction parameter(s) 305 for color correcting partition K42 of the video frame 130 are selected from partition P43 of the grid color map data 220 for the color map.

Figure 4:
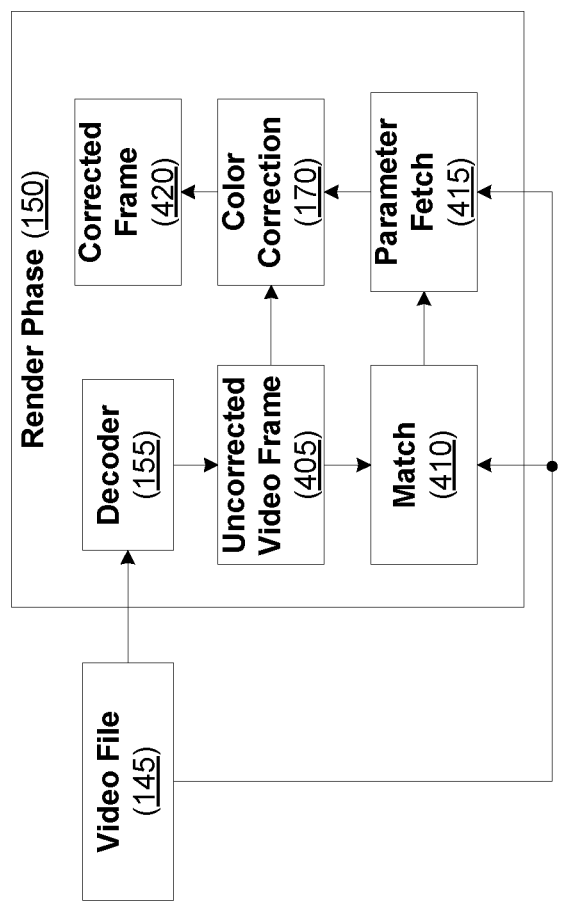
FIG. 4 illustrates a flow diagram for rendering a frame of a video file according to an example implementation.

FIG. 4 illustrates a flow diagram of rendering a frame of a video file according to an example implementation. As shown in FIG. 4, video file 140 (or video file 145) is input to the render phase 150 where the decoder 155 decodes the video file. As discussed above, the video file 145 can include video 205 including data (e.g., metadata 210) that can be used to color correct frames of video. Flow continues to the uncorrected video frame 405 block where a video frame is selected. The selected video frame is a video frame to be color corrected.

Then in the match 410 block the video frame is partitioned into N×M partitions or blocks and each block is matched to a block in the one of the plurality of frames 120 that corresponds to the image 5 (e.g., both captured by a same shutter event). Then, in the parameter fetch 415 block the correction parameters associated with the matched blocks are fetched (e.g., requested and retrieved) from the video 205. For example, at least one parameter is selected from grid color map data 220 using the column 230 and row 235 values of the corresponding matched block. Then the correction 170 block generates the corrected frame using the uncorrected video frame 405 and the at least one parameter as discussed above.

Figure 5A:
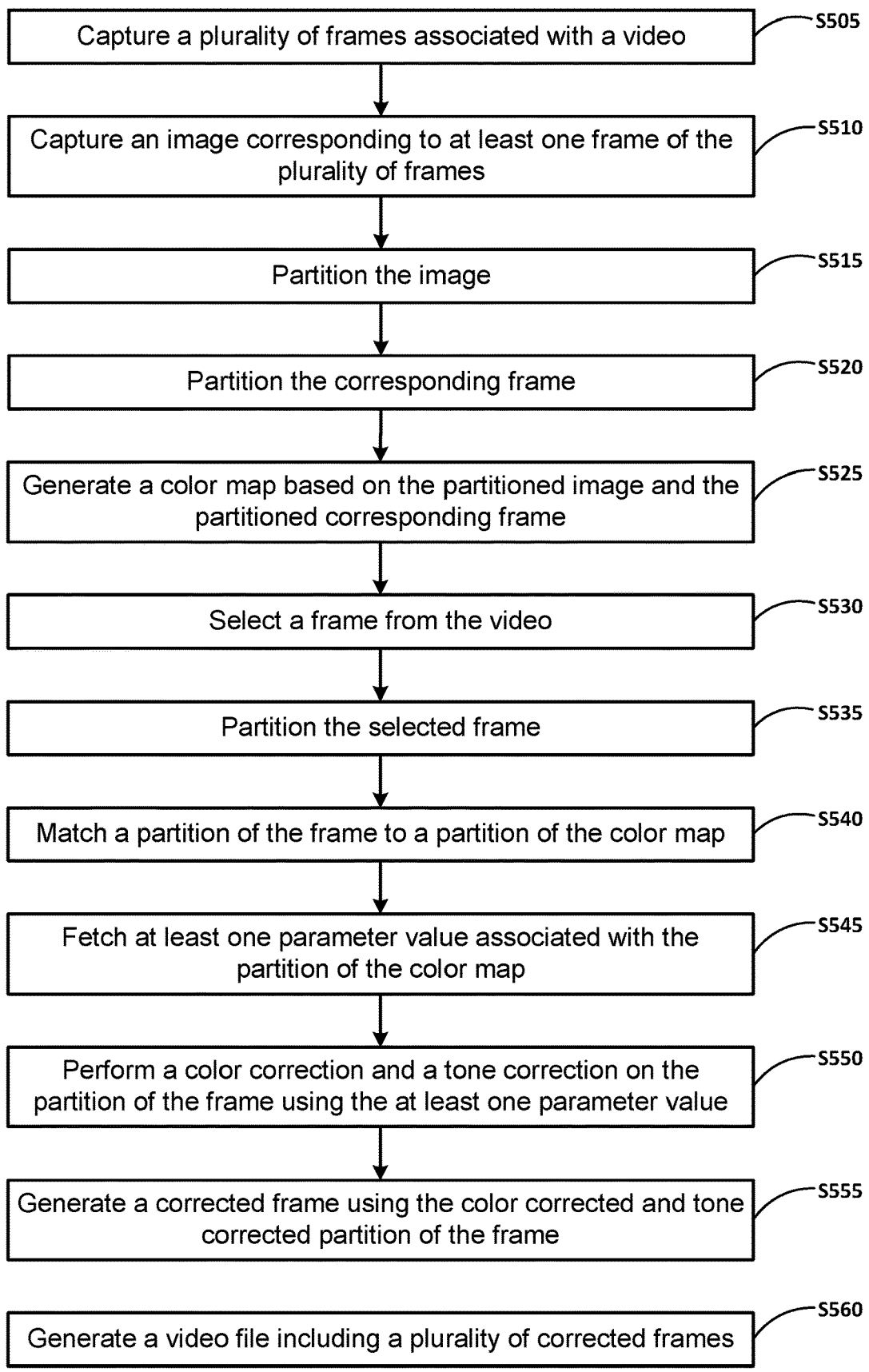
FIG. 5A illustrates a flow diagram for generating a video file according to an example implementation.
Figure 5B:
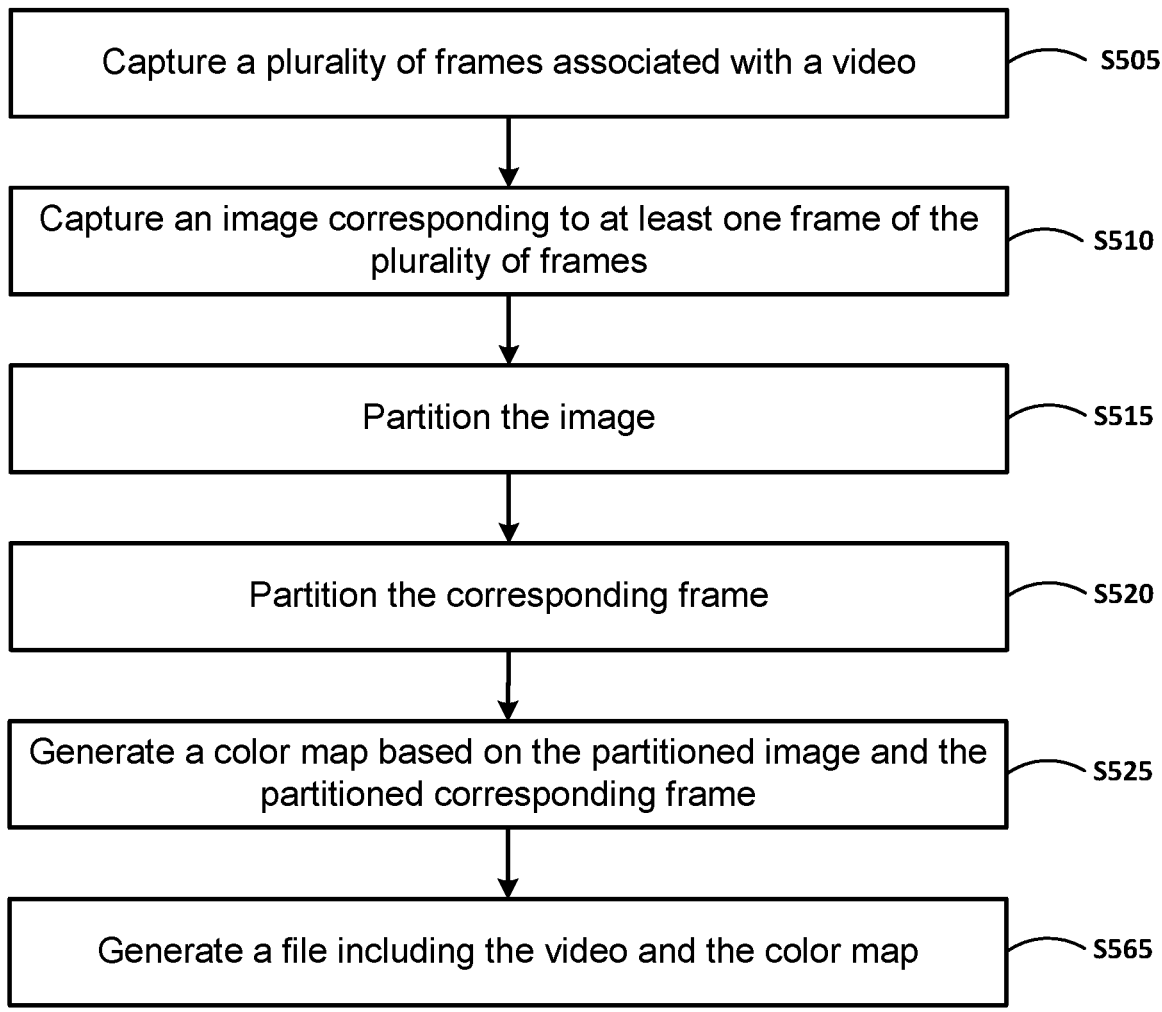
FIG. 5B illustrates another flow diagram for generating a video file according to an example implementation.
Figure 6:
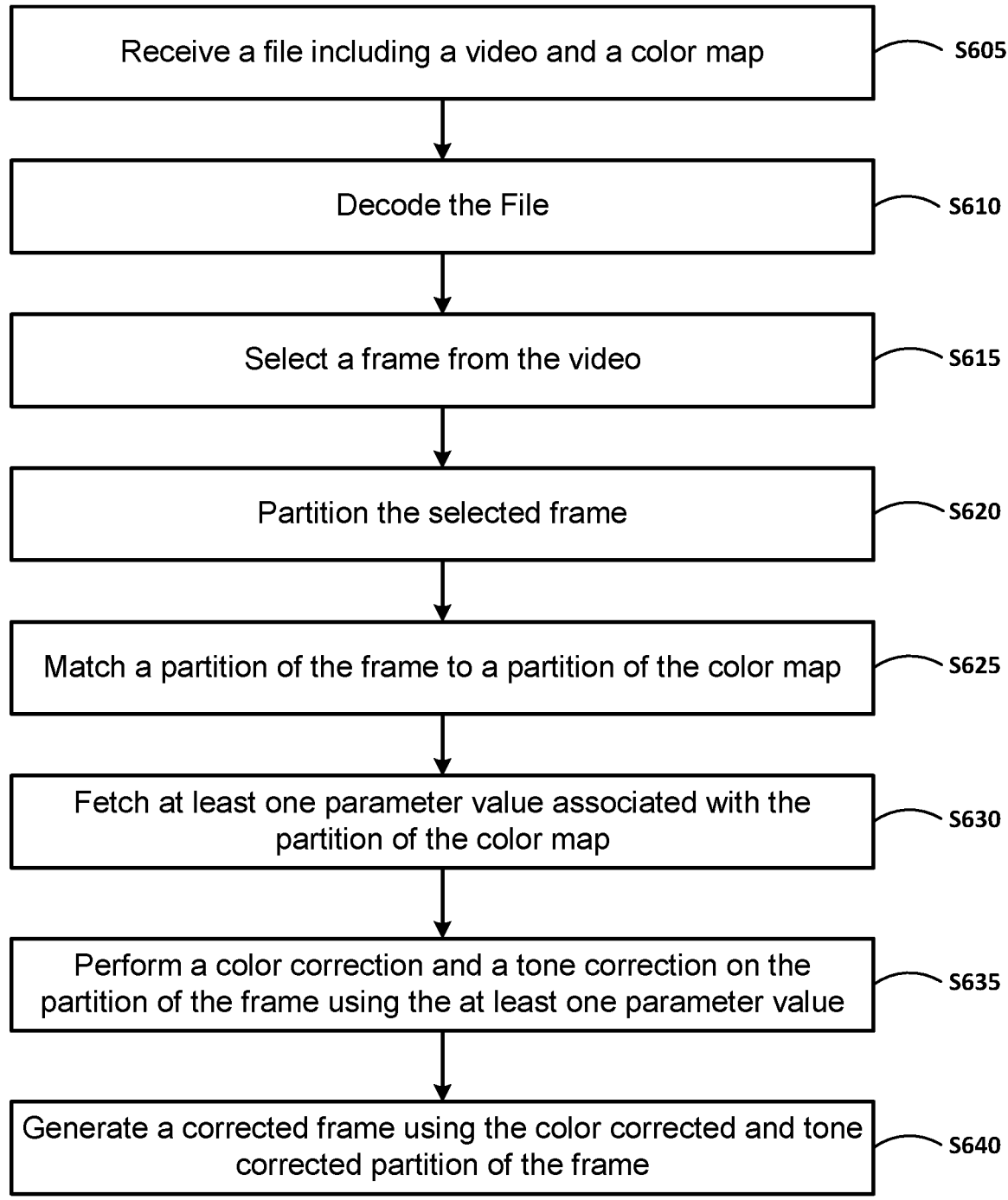
FIG. 6 illustrates a flow diagram for generating a color and tone corrected frame of a video according to an example implementation.

FIGS. 5A, 5B and 6 are flowcharts of methods according to example implementations. The steps described with regard to FIGS. 5A, 5B and 6 may be performed due to the execution of software code stored in a memory associated with an apparatus (e.g., a computing device configured to capture a video and/or render the video) and executed by at least one processor associated with the apparatus. However, alternative implementations are contemplated such as a system embodied as a special purpose processor like Application-specific integrated circuit (ASIC). Although the steps described below are described as being executed by a processor, the steps are not necessarily executed by a single processor. In other words, at least one processor may execute the steps described below with regard to FIGS. 5A, 5B and 6.

FIG. 5A illustrates a flow diagram for generating a video file according to an example implementation. As shown in FIG. 5A, in step S505 a plurality of frames associated with a video are captured. For example, a device including a camera (e.g., a digital camera, a digital video device, a mobile phone and the like) is operated by a user to capture the plurality of frames which can be stored together as a video.

In step S510 an image corresponding to at least one frame of the plurality of frames is captured. For example, the image can be captured by the camera. In an example implementation, the image 5 can be captured at substantially (e.g., by a same shutter event) same moment in time as one of the plurality of frames 120.

In step S515 the image is partitioned. For example, the image can be partitioned into N×M grid of partitions or blocks. As discussed above, image 5 can be partitioned into a 4×4 grid of 16 partitions.

In step S520 the corresponding frame is partitioned. For example, the frame can be partitioned into N×M grid of partitions or blocks. As discussed above, the frame (of the plurality of frames 120) captured at substantially (e.g., by a same shutter event) same moment in time as the image 5 can be partitioned into a 4×4 grid of 16 partitions.

In step S525 a color map is generated based on the partitioned image and the partitioned corresponding frame. For example, the color map can be generated based on the corresponding one of the plurality of frames 120 and the image 5. The color map can include the color and tone variance between the corresponding one of the plurality of frames 120 and the image 5. For example, the corresponding one of the plurality of frames 120 can be stored using the YUV color space and the image 5 can be stored using the YUV color space. Accordingly, the color map can include the difference between a Y (luminance) and UV (chrominance) of the corresponding one of the plurality of frames 120 and the image 5. The color map can include a pixel-by-pixel variance, a value associated with a block of pixels, a value associated with a partition of the corresponding one of the plurality of frames 120 and/or the image 5 and the like. The plurality of frames 120 and/or the image 5 can be stored using a color space other than the YUV color space. For example, the plurality of frames 120 and/or the image 5 can be stored using the RGB, Y'UV, YCbCr, YPbPr, and the like color spaces.

In step S530 a frame from the video is selected. For example, each of the plurality of frames associated with the video can be targeted for color correction. Therefore, the selected frame can be one of the plurality of frames. In an example implementation, each of the plurality of frames is selected sequentially (or in some other order) for color correction. Then, in step S535 the selected frame is partitioned. For example, the selected frame can be partitioned into N×M grid of partitions or blocks.

In step S540 a partition of the frame is matched to a partition of the color map. For example, in order to process (e.g., color and tone correct) the selected video frame (e.g., video frame 130), a partition (e.g., the pixels of the partition) can be matched to (or a match can be found in) a partition in frame (of the plurality of frames 120) captured at substantially (e.g., by a same shutter event) same moment in time as the image. As is shown above in FIG. 3, partition K42 of the video frame 130 is matched to partition S43 of the frame 20. Then, in step S545 at least one parameter value associated with the partition of the color map is fetched. Continuing the example, during color correction, the correction parameter(s) 305 for color correcting partition K42 of the video frame 130 are selected from partition P43 of the grid color map data 220 for the color map.

In step S550 a color correction and a tone correction is performed on the partition of the frame using the at least one parameter value. For example, the at least one parameter value can be used to perform color and/or tone correction on the selected frame. In an example implementation, Y (luminance) can be corrected using gamma correction $Y_{corrected} = Y^\gamma$ and UV (chrominance) can be corrected using a mean value of U, V and a variance value of U, V. For example, the mean value of U, V can be subtracted from the data and the result can be scaled based on the variance of U, V. Accordingly, the at least one parameter value can include a gamma correction value, a mean value of U, V and a variance value of U, V.

As discussed above, in one or more other example implementation, a color correction matrix (CCM) technique, a trained convolutional neural network (CNN) technique, a histogram matching technique and/or a point based transfer technique can be used to correct for tone and/or color. In addition, as discussed above, color correction process include a smoothing and/or blending process to remove or minimize the tone and/or color discontinuities along a border between two partitions in a grid. Although the YUV color space is referenced, other image color spaces (e.g., RGB, Y'UV, YCbCr, YPbPr, and the like) color spaces can be used in example implementations described herein.

In step S555 a corrected frame is generated using the color corrected and tone corrected partition of the frame. For example, steps S540 to S550 can be repeated for each partition to color correct all of the frame partitions. Accordingly, the frame is color corrected.

In step S560 a video file including a plurality of corrected frames is generated. For example, steps S530 to S555 can be repeated for each of the plurality of frames. Then, the video file (e.g., video file 140) can be generated using the plurality of color corrected frames.

In an example implementation, the color correction can be performed on a rendering device (e.g., a device that is not the capture device). In this implementation, the capture device can perform steps S505 to S525 and not steps S530 to S560. FIG. 5B illustrates another flow diagram for generating a video file according to an example implementation. As shown in FIG. 5A, in step S565 a file including the video and the color map is generated. For example, the color map can be included in a data structure corresponding to the video 205 as described above. The color map can be inserted and stored, for example, in a header associated with the video. The video 205 and/or the metadata 210 can be compressed prior to storing the color map as metadata in the header.

FIG. 6 illustrates a flow diagram for generating a color and tone corrected frame of a video according to an example implementation. As shown in FIG. 6, in step S605 a file including a video and a color map is received. For example, the file can be on a memory device (e.g., memory stick, CD-ROM, or the like) and/or downloaded from a cloud device. For example, the color map can be included in a data structure including the metadata 210 as described above. The image data can be stored, for example, as metadata in a header associated with the video.

In step S610 the file is decoded. For example, the video file 140 and/or the video file 145 can be compressed prior to storing the video 205 including metadata 210 in the header. Therefore, the file can be decoded/decompressed using a same standard that the video file 140 and/or the video file 145 was compressed using.

In step S615 a frame from the video is selected. For example, each of the plurality of frames associated with the video can be targeted for color correction. Therefore, the selected frame can be one of the plurality of frames. In an example implementation, each of the plurality of frames is selected sequentially (or in some other order) for color correction. Then, in step S620 the selected frame is partitioned. For example, the selected frame can be partitioned into N×M grid of partitions or blocks.

In step S625 a partition of the frame is matched to a partition of the color map. For example, in order to process (e.g., color and tone correct) the selected video frame (e.g., video frame 130), a partition (e.g., the pixels of the partition) can be matched to (or a match can be found in) a partition in frame (of the plurality of frames 120) captured at substantially (e.g., by a same shutter event) same moment in time as the image. As is shown above in FIG. 3, partition K42 of the video frame 130 is matched to partition S43 of the frame 20. Then, in step S630 at least one parameter value associated with the partition of the color map is fetched. Continuing the example, during color correction, the correction parameter(s) 305 for color correcting partition K42 of the video frame 130 are selected from partition P43 of the grid color map data 220 for the color map.

In step S635 a color correction and a tone correction is performed on the partition of the frame using the at least one parameter value. For example, the at least one parameter value can be used to perform color and/or tone correction on the selected frame. For example, the at least one parameter value can be used to perform color and/or tone correction on the selected frame. In an example implementation, Y (luminance) can be corrected using gamma correction $Y_{corrected}=Y^\gamma$ and UV (chrominance) can be corrected using a mean value of U, V and a variance value of U, V. For example, the mean value of U, V can be subtracted from the data and the result can be scaled based on the variance of U, V. Accordingly, the at least one parameter value can include a gamma correction value, a mean value of U, V and a variance value of U, V.

As discussed above, in one or more other example implementation, a color correction matrix (CCM) technique, a trained convolutional neural network (CNN) technique, a histogram matching technique and/or a point based transfer technique can be used to correct for tone and/or color. In addition, as discussed above, color correction process include a smoothing and/or blending process to remove or minimize the tone and/or color discontinuities along a border between two partitions in a grid. Although the YUV color space is referenced, other image color spaces (e.g., RGB, Y'UV, YCbCr, YPbPr, and the like) color spaces can be used in example implementations described herein.

In step S640 a corrected frame is generated using the color corrected and tone corrected partition of the frame. For example, steps S540 to S550 can be repeated for each partition to color correct all of the frame partitions. Accordingly, the frame is color corrected.

Figure 7:
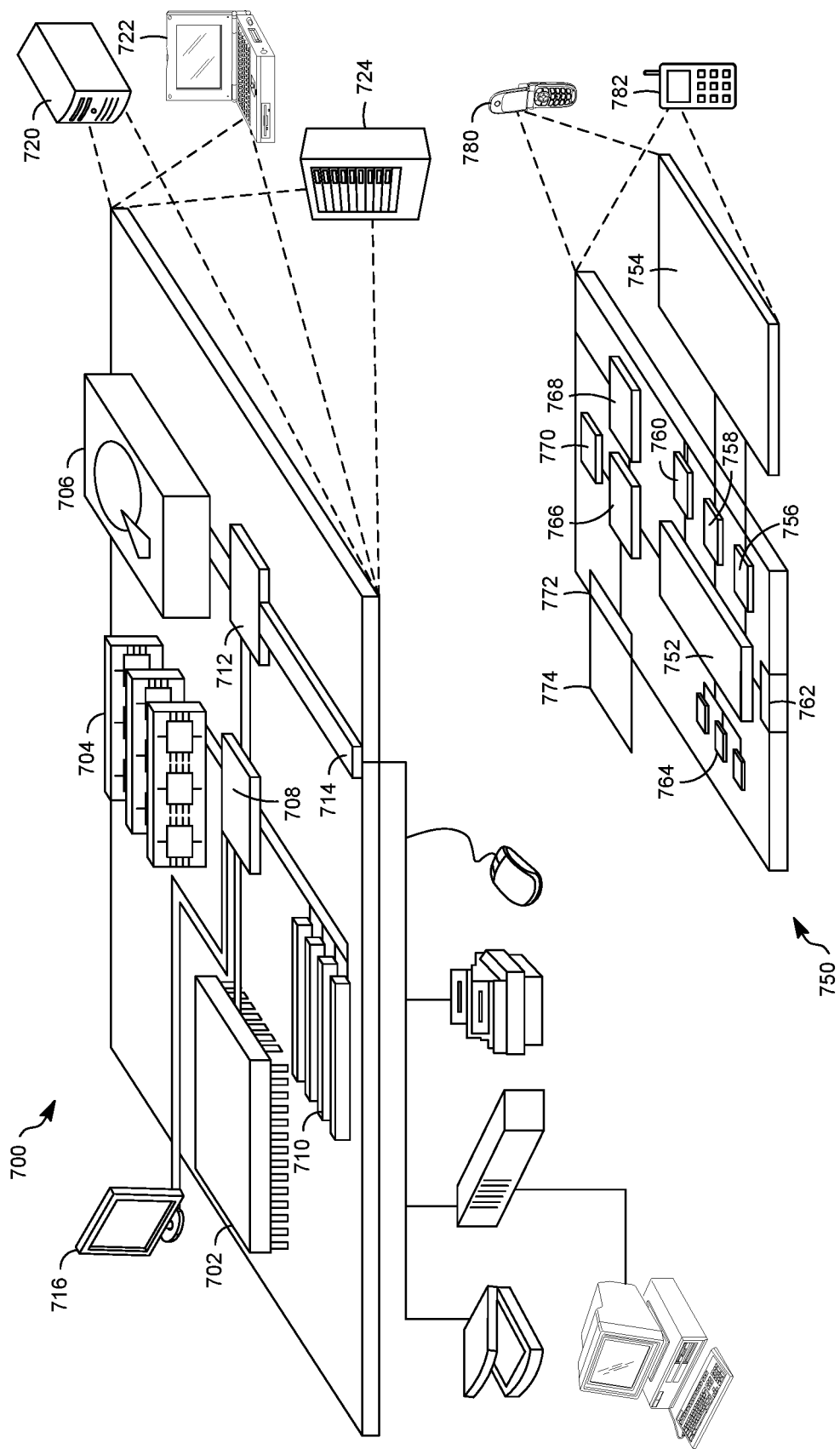
FIG. 7 shows an example of a computer device and a mobile computer device according to at least one example implementation.

FIG. 7 shows an example of a computer device 700 and a mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDM72000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A method comprising:
capturing a plurality of frames associated with a video file;
identifying an image corresponding to one of the plurality of frames;
generating a color map based on a color and a tone of the identified image;
matching a portion of the color map to a portion of the corresponding frame of the plurality of frames;
tone correcting a selected frame from the plurality of frames associated with the video file based on a correctable quality parameter of the matched portion of the color map; and
color correcting the selected frame based on a correctable quality parameter of the matched portion of the color map.

2. The method of claim 1, further comprising performing a post-capture process on the identified image to improve a visual quality of the image.

3. The method of claim 1, wherein the color map includes at least one correctable quality parameter indicating a difference between the identified image and the corresponding frame.

4. The method of claim 1, wherein
the matching of the portion of the color map to the portion of the corresponding frame of the plurality of frames includes matching at least one of a pixel, a block of pixels, a range of pixels, or a partition of the selected frame to at least one of a pixel, a block of pixels, a range of pixels, or a partition of the color map, the method further comprising:
using a value of the color map to perform the tone correcting of the selected frame, and
using the value of the color map to perform the color correcting of the selected frame.

5. The method of claim 1, wherein:
the color map is partitioned into an M×N grid having M columns and N rows,
each partition includes data indicating a correction parameter, and
the correction parameter includes a value for gamma correction.

6. The method of claim 1, wherein the color correcting of the selected frame includes performing a smoothing process to minimize color discontinuities in the selected frame.

7. The method of claim 1, wherein the image and the frame to which the image corresponds are captured in a same instance.

8. The method of claim 1, further comprising:
partitioning the identified image; and
partitioning the corresponding frame into a partitioned frame,
wherein generating the color map further includes:
determining a color variance between each partition of the image and a corresponding partition of the partitioned frame,
determining a tone variance between each partition of the image and a corresponding partition of the partitioned frame, and
wherein at least one of the determined color variance and the determined tone variance is based on a luminance difference or a chrominance difference.

9. A method comprising:
capturing a plurality of frames associated with a video file;
identifying an image corresponding to one of the plurality of frames;
generating a color map based on a color and a tone of the image, wherein the color map is partitioned with a partition matching a portion of a frame of the plurality of frames and including a correctable quality parameter;
generating a data structure including data representing the color map and data representing the partitioned color map; and
storing the data structure as metadata in a header associated with the video.

10. The method of claim 9, further comprising performing a post-capture process on the identified image to improve a visual quality of the image.

11. The method of claim 9, wherein the color map includes at least one correctable quality parameter difference between the image and the frame to which the image corresponds.

12. The method of claim 9, wherein
generating the data structure includes partitioning the color map into an M×N grid having M columns and N rows,
each partition includes data indicating a correction parameter,
the correction parameter includes a value for gamma correction.

13. The method of claim 9, further comprising:
partitioning the identified image; and
partitioning the frame to which the image corresponds into a partitioned frame,
wherein generating the color map further includes:
determining a color variance between each partition of the image and a corresponding partition of the partitioned frame,
determining a tone variance between each partition of the image and a corresponding partition of the partitioned frame,
wherein at least one of the color variance and the tone variance is based on a luminance difference or a chrominance difference.

14. A method comprising:
receiving a video file including a plurality of frames and a header including a data structure including data representing a color map;
selecting a first frame of the plurality of frames, the first frame being associated with the data representing the color map;
selecting a second frame of the plurality of frames, the second frame being a target frame for color correction;
matching a portion of the color map to a portion of the second frame;
tone correcting the second frame based on a correctable quality parameter of the matched portion of the color map; and color correcting the second frame based on a correctable quality parameter of the matched portion of the color map.

15. The method of claim 14, wherein the matching of the portion of the color map to the portion of the second frame includes matching at least one of a pixel, a block of pixels, a range of pixels, or a partition of the second frame to at least one of a pixel, a block of pixels, a range of pixels, or a partition of the color map, the method further comprising:
using a value of the color map to perform the tone correcting of the second frame, and
using the value of the color map to perform the color correcting of the second frame.

16. The method of claim 14, wherein
the color map is partitioned into an M×N grid having M columns and N rows,
each partition of the partitioned color map includes data indicating a correction parameter, and
the correction parameter includes a value for gamma correction.

17. The method of claim 14, wherein color correcting the second frame includes performing a smoothing process to minimize color discontinuities.

18. The method of claim 14, wherein color correcting the second frame includes performing a blending process to minimize color discontinuities.

19. The method of claim 14, wherein color correcting the second frame includes using a trained convolutional neural network to minimize color variance between a partition of the second frame and a partition of the color map.

20. The method of claim 14, wherein color correcting the second frame includes a performing a chrominance correction process using a mean value of a color space variable and a variance value of the color space variable.

* * * * *